United States Patent

[11] 3,590,565

[72] Inventors Austin Iball
Portland House, Brunswick Road;
Charles Malcolm Iball, 2 Selsden Close,
South Down Park, Mole Road, both of
Buckley, Flintshire, Wales
[21] Appl. No. 827,319
[22] Filed May 23, 1969
[45] Patented July 6, 1971
[32] Priority May 23, 1968
[33] Great Britain
[31] 24,568/68

[54] FRUIT PICKING APPARATUS
5 Claims, 3 Drawing Figs.

[52] U.S. Cl. ............................................. 56/328
[51] Int. Cl. .......................................... A01g 19/04
[50] Field of Search ........................... 56/328, 336

[56] References Cited
UNITED STATES PATENTS
3,413,787 12/1968 Van Antwerp et al. ........ 56/328
2,407,039 9/1946 Thomas ........................ 56/336
3,485,026 12/1969 Davis .......................... 56/328

*Primary Examiner*—Louis G. Mancene
*Assistant Examiner*—J. N. Eskovitz
*Attorney*—Scrivener, Parker, Scrivener and Clarke ABSTRACT: This invention provides apparatus for fruit picking in which a bucket for supporting a fruit picker is carried at the upper end of an extending arm or boom mounted on a base which may comprise or itself be mounted on a vehicle for driving or towing between rows of trees in an orchard. A conveyor is provided along the length of the extending arm for conveying picked fruit from the bucket to the base. Fruit sorting means is provided adjacent or in the base to which fruit is supplied from the lower end of the conveyor. Additionally, fruit picking apparatus is mounted at or adjacent the bucket for operation by the operator standing in the bucket to sever and collect fruit. Controls are mounted in the bucket to operate the raising and lowering mechanism for the arm and the controls may be duplicated for operation from the base or thereabouts.

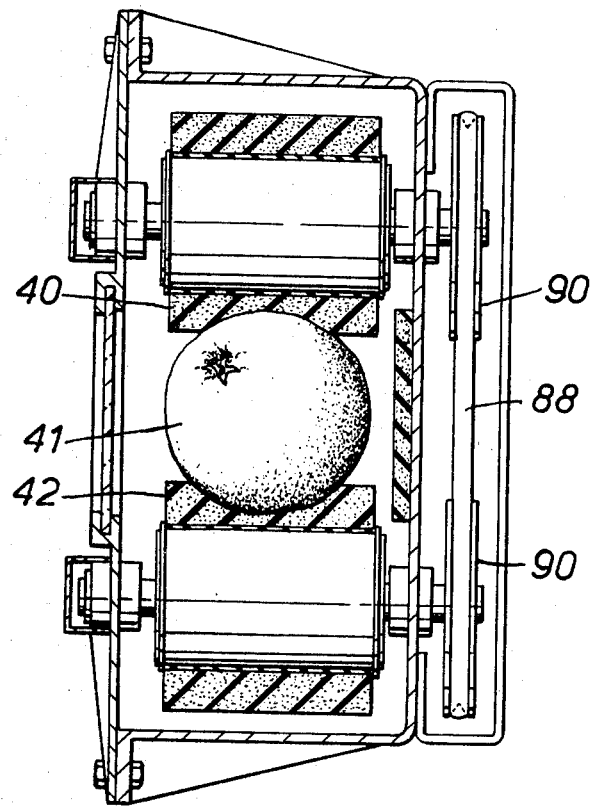

FRUIT PICKING APPARATUS

This invention concerns apparatus for fruit picking and in particular lifting and conveying apparatus for lifting and supporting a fruit picker adjacent trees to be picked and conveying picked fruit from the picking position to ground level; hereinafter referred to as apparatus of the type described.

According to the broadest aspect of the present invention apparatus of the type described for mounting on a vehicle comprises a base, a cantilevered arm mounted on the base to extend upwardly therefrom, a bucket in which a fruit picker can stand carried at the remote end of the arm and adapted to occupy the same attitude at all times and conveyor means between the bucket and the base for conveying picked fruit therebetween, the attitude of the cantilevered arm and therefore the height and position of the bucket being controllable at least from the bucket.

Preferably the base is mounted on a trailer which may be one of a number of trailers which can be attached to a tractor for hauling between rows of trees in an orchard. Alternatively the base may be mounted on a self-propelled vehicle including steering, braking and driving controls so as to be independent of additional traction means.

Preferably the vehicle or vehicles on which the apparatus is mounted includes a fruit sorting and fruit storing means and the conveyor means serves to supply picked fruit to the input to the fruit sorting means.

Preferably the cantilevered arm is formed in two parts and comprises a lower boom pivotally mounted at one end to the base and at the other to one end of an upper boom which carries the bucket at its other end. In this arrangement the conveyor means includes means for compensating for variations in path length thereof, with variation in relative positions of the two booms.

Although the fruit may be picked entirely by hand and placed individually onto the conveyor means, a mechanical picking aid is preferably provided, to facilitate this work.

According therefore to a further aspect of the present invention relates to a device for carrying out a severing operation at a station remote from an operator and for conveying severed articles from said remote station comprises a flexible rigid duct having severing means mounted at one end thereof operatively connected to actuating means at or adjacent the other end thereof.

Preferably the duct is formed from a continuous strip of a rigid thermoplastic material which is coiled into a duct of a desired diameter. The edges of the strip interlock when coiled. Such a duct is flexible and retains a constant diameter when bent. It is sufficiently rigid not to collapse under its own weight.

The invention will now be described further by way of example with reference to the accompanying drawings, in which:

FIG. 3 is a cross section view of fruit conveyor means as employed in the apparatus of FIGS. 1 and 2.

Figure 1:
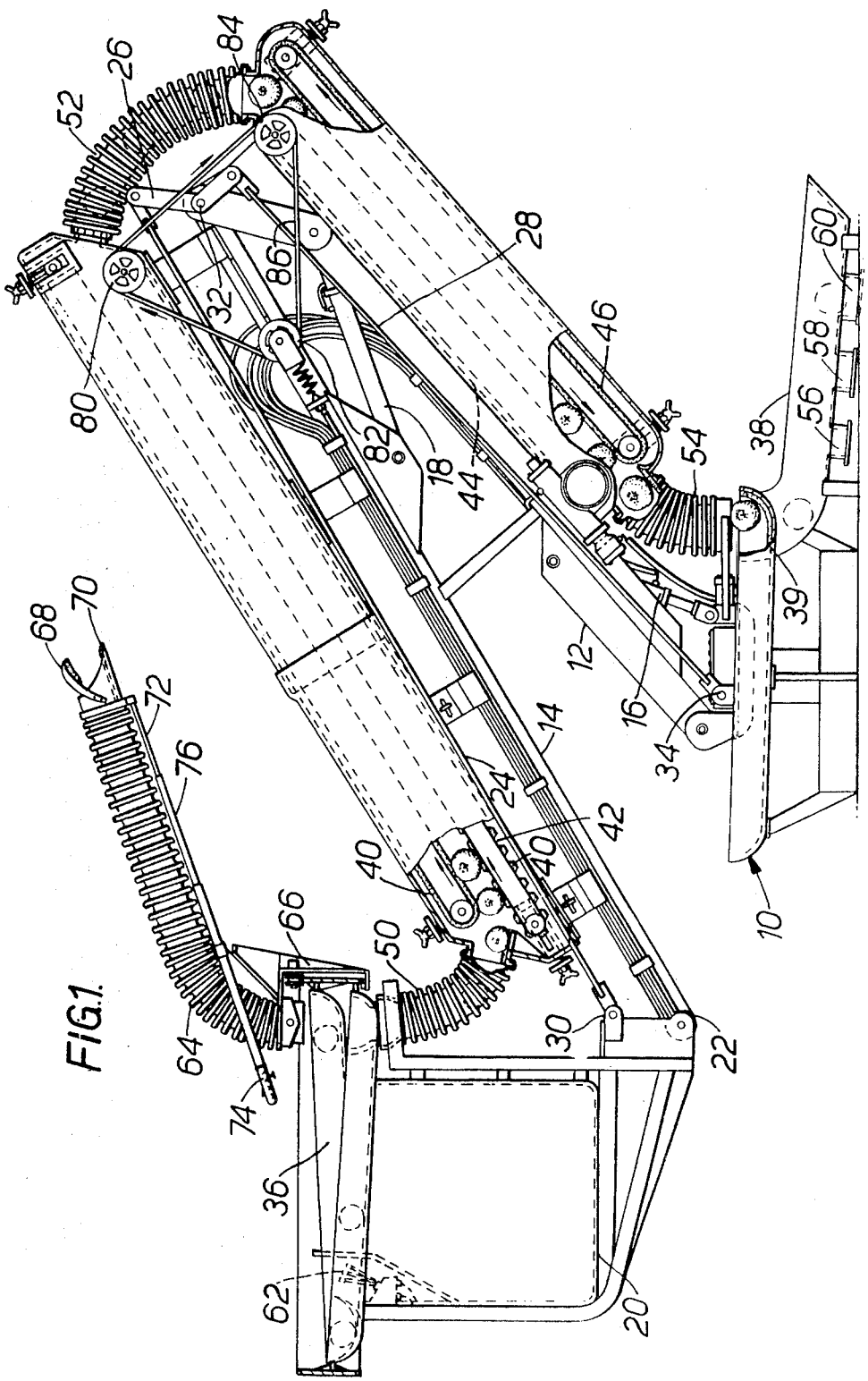
FIG. 1 is a side elevation of apparatus embodying the invention.
Figure 2:
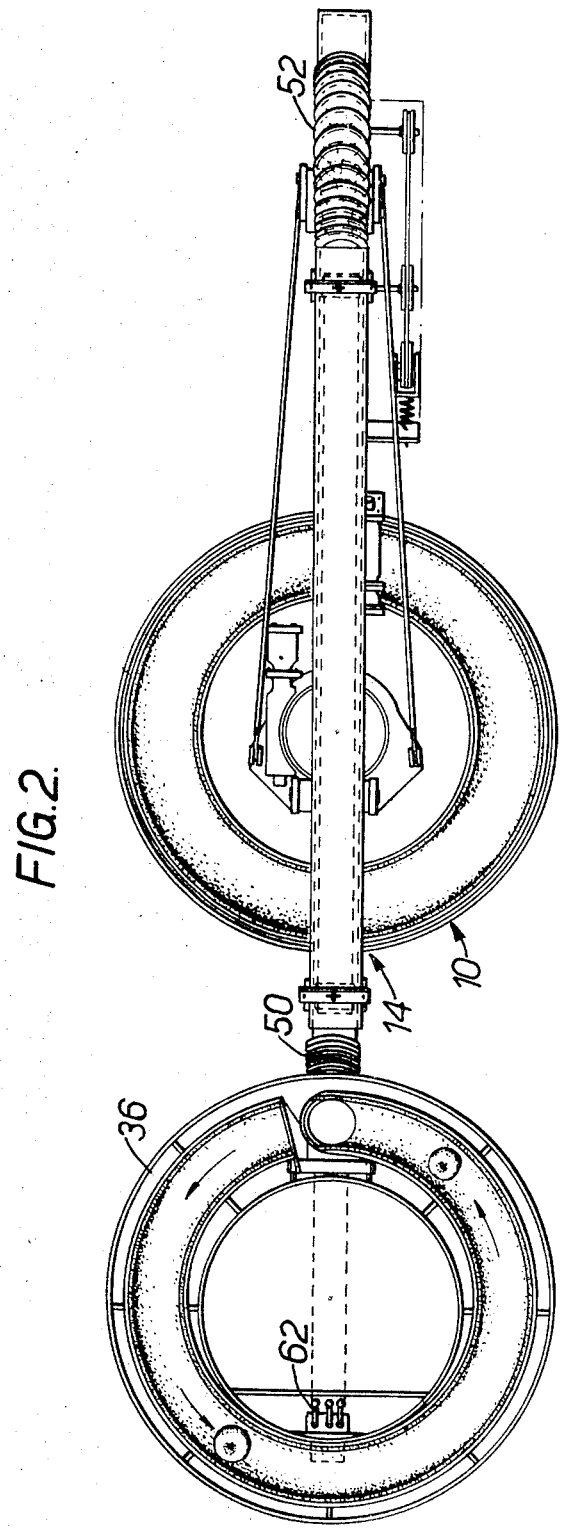
FIG. 2 is a plan view of the apparatus of FIG. 1.

The apparatus shown in FIG. 1 is adapted for mounting on a trailer (not shown) and includes a turntable generally designated 10, a two-part cantilevered arm carried by the turntable comprising a lower boom 12 pivotally mounted on the turntable 10 and an upper boom 14 pivotally joined to the end of the lower boom 12 remote from the turntable and hydraulic jacks 16, 18 respectively between the turntable and the lower boom and between the upper and lower booms to raise and lower the boom relative to the turntable and raise and lower the upper boom relative to the lower boom respectively.

A bucket 20 is hinged at 22 to the free end of the upper boom. A mechanical linkage 24, 26, 28 is pivotally joined to a point 30 on the bucket above the hinge axis 22, a pivot point 32 at the junction of the upper and lower booms and to a pivot point 34 on the base. The overall length of the linkage is adjusted so that whatever the inclined positions of the two booms 12, 14 the bucket always remains upright. The rim of the bucket includes an upwardly open channel 36 into which picked fruit can be placed. The channel 36 is inclined from the front to the rear of the bucket so that fruit placed therein tend to roll towards the rear.

Two conveyors, one on each boom, serve to convey picked fruit from the channel 36 to a fruit collecting and sorting chute 38 under the lower boom 12.

The two conveyors are similar and each comprises two endless belts (40, 42; 44, 46) for example of cotton or nylon. The belts have foamed plastics padding or other soft pliable material (as shown at 48) on their external surfaces and are constrained to run parallel with each other. The lower belt in the conveyor in the upper boom is set ahead of the upper belt so that fruit falling from the rim channel 36 is caught by the lower belt and is then sandwiched between the two belts and conveyed along the upper boom. A flexible tube 50 communicates between the channel 36 and the input of conveyor belts 40, 42 and a second flexible tube 52 communicates between the output of conveyor belts 40, 42 and input of conveyor belts 44, 46 in the lower boom. The two belts 44, 46 are also staggered for the same purpose as the belts 40, 42 are staggered. The collecting and sorting chute 38 is downwardly inclined and includes an upwardly open annular fruit receiving channel 39 into which fruit are guided from the lower end of the conveyor in the boom 12 by a flexible tube 54 the lower end of which is constrained to follow the circular path around said annular channel 39. Three apertures 56, 58, 60 are formed in the floor of the chute 38, the apertures increasing in size with their distance from the channel 39. Fruit will fall through one of the three apertures depending on size and is thus sorted into three grades of size.

Flexible tubes (not shown) are connected to the apertures (56, 58, 60) in the chute to convey the sorted fruit into three different collecting bins or baskets (not shown) which may be located on separate vehicles towed by the vehicle carrying the cantilevered arm.

The apparatus may be controlled from ground level by appropriate control means (not shown) mounted on the vehicle for regulating the supply of fluid to the hydraulic rams. Duplicate controls 62 are provided in the bucket so that the picker can control the apparatus.

A cross section through the upper boom is shown in FIG. 3 which illustrates the cushioning material 40, 42 on the two endless belts between which fruit (such as 41) is gripped. To transmit drive between one boom and the other three pulleys 80, 82, 84 are provided and an endless driving belt 86. A more positive drive is obtained by duplicating the pulleys 80, 82, 84 and belt 86 (not shown) on the other side of the boom as shown in FIG. 1.

The two belts in each conveyor are kept in phase by V-belts 88 passed around V-pulleys 90 (FIG. 3). Preferably pulleys 90 are duplicated and fitted on both sides of the boom.

A rigid yet flexible duct 64 formed from a continuous strip of thermoplastic material, the edges of which interlock when coiled is carried at its lower end by a bracket 66 adapted to traverse the circular periphery of the channel 36 and carries over its upper end a severing or cutting means. This takes the form of one fixed cutter blade 68 and a blade 70 movable relative thereto. The movable blade is coupled through a mechanical linkage 72 to a handle 74 at the other end of the duct. The interior of the duct is lined with a cushioning material, for example foam rubber, (not shown) so as to prevent bruising of fruit in falling down the duct. Across the exit end of the duct, that is the end adjacent to the actuating mechanism, a yieldable portion of cushioning material (not shown) is installed to break the fall of fruit emerging from the duct.

In use the device is moved until the end carrying the blades is located beneath a fruit to be picked. The actuating mechanism is then operated to move the movable blade against the fixed blade and to sever the fruit from the tree. The fruit then falls down the lined interior of the duct the yieldable portion of cushioning material across the exit end of the duct serving to break the fall of the fruit. This, together with the internal lining in the duct minimizes bruising of the fruit.

The duct is flexible but does not yield or bend under its own weight when hoisted and in addition its cross section remains constant even when bent. The diameter of the duct can be varied within limits by twisting.

If desired a duct can be formed from a number of short lengths of coiled thermoplastic material which can readily be joined together. In this way the length of the duct can be varied to meet different requirements. A suitable adjuster 76 is provided in the linkage between the cutting and actuating mechanisms to cater for changes in the length of the duct.

We claim:

1. Apparatus for mounting on a vehicle comprising a base, a cantilevered arm pivotally mounted on the base about a vertical axis and extending upwardly therefrom, a bucket in which a fruit picker can stand carried at the remote end of the arm and adapted to occupy the same attitude at all times, conveyor means between the bucket and the base for conveying picked fruit therebetween, a fruit-receiving rim around the upper periphery of the bucket, a fruit delivery outlet in said rim, and flexible walled ducting extending between said outlet and the input of said conveyor means, the attitude of the cantilevered arm and therefore the height and position of the bucket being controllable at least from the bucket, the cantilevered arm comprising first and second booms pivotally interconnected and extending between pivotal connections on said bucket and on said base, the conveyor means comprising a first conveyor in the said first boom and a second conveyor in the said second boom and each said first and second conveyor comprising a first endless belt of which a section runs parallel to the boom, a second endless belt of which a section runs adjacent and parallel to but spaced apart from the section of the first belt which runs parallel to the boom, means being provided to drive each endless belt in a direction such that over the two adjacent sections thereof the belts move in the same direction.

2. Apparatus as set forth in claim 1 comprising an upwardly open, annular fruit duct concentrically arranged around the said axis on the base, a fruit-sorting duct having an open upper inlet end beneath said annular fruit duct, and a fruit delivery outlet in the annular duct communicating with said open upper end of said fruit sorting duct.

3. Apparatus as set forth in claim 2 comprising a rotatable fruit guide mounted above said annular fruit duct for rotation about said vertical pivotal axis with the guide at all times in vertical alignment with the upwardly open annular fruit duct, means connecting the guide to the outlet end of said second boom to rotate about said axis therewith and flexible walled ducting extending between the delivery end of the conveyor in said second boom and said fruit guide.

4. Apparatus as set forth in claim 1, further comprising a flexible duct, severing means mounted at a remote end thereof, actuating means at or adjacent the other end, means operatively connecting the severing means and actuating means, and means mounting the duct for movement of the said other end around said fruit-receiving rim.

5. Apparatus as set forth in claim 4 wherein said flexible duct is formed from a continuous length of thermoplastic strip material which is coiled into a duct of desired diameter, the edges of the strip interlocking when coiled.